July 23, 1929.  F. A. SELJE  1,721,976

VEHICLE BODY

Filed Sept. 29, 1927

INVENTOR
FREDERICK A. SELJE.
BY
Irving Harness
ATTORNEY

Patented July 23, 1929.

1,721,976

UNITED STATES PATENT OFFICE.

FREDERICK A. SELJE, OF DETROIT, MICHIGAN, ASSIGNOR TO CHRYSLER CORPORATION, OF DETROIT, MICHIGAN, A CORPORATION OF DELAWARE.

VEHICLE BODY.

Application filed September 29, 1927. Serial No. 222,723.

This invention relates to a vehicle body construction and more particularly to a rumble seat construction therefor.

In the manufacture of roadster bodies it is desirable to provide an auxiliary seat at the rear of the body and it has been usual practice to construct the seat back in such a manner that it may be folded forward to form a cover for the opening in the body to the auxiliary seat when it is not in use.

It is an important object of this invention to provide means for automatically opening the cover or seat back when it is released to place it in a position where it may be used as a seat back.

Another object of the invention is to provide means for retarding the action of the operating means so that the seat back will not suddenly be brought to its raised position with a force which might injure parts of the construction.

Other objects and advantages will more fully appear from the following description taken in connection with the accompanying drawings in which.

Figure 1:
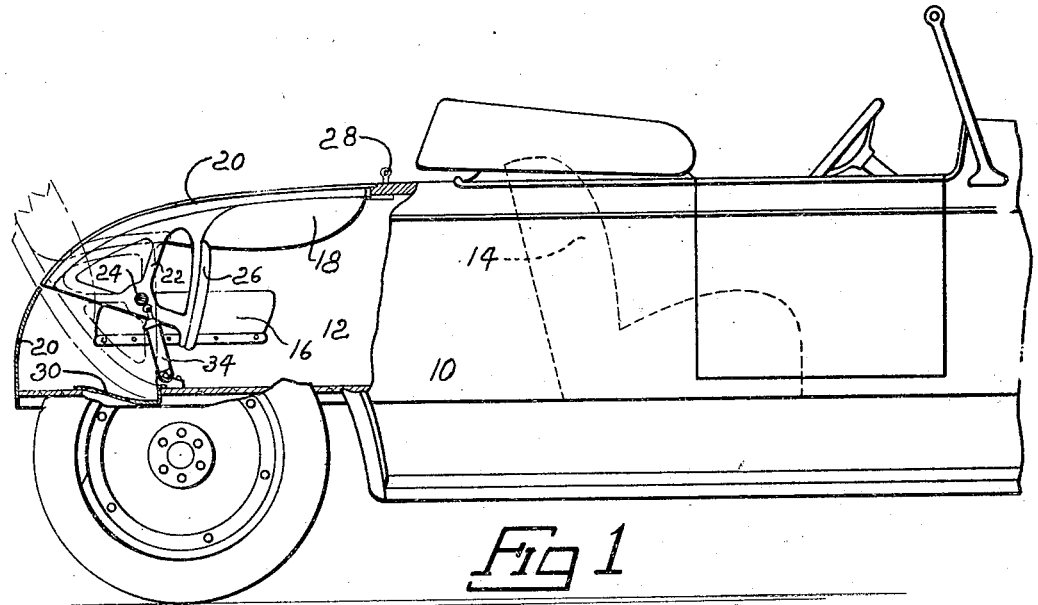
Fig. 1 is a side elevation of a vehicle body, parts being broken away, showing a preferred embodiment of my invention.
Figure 2:
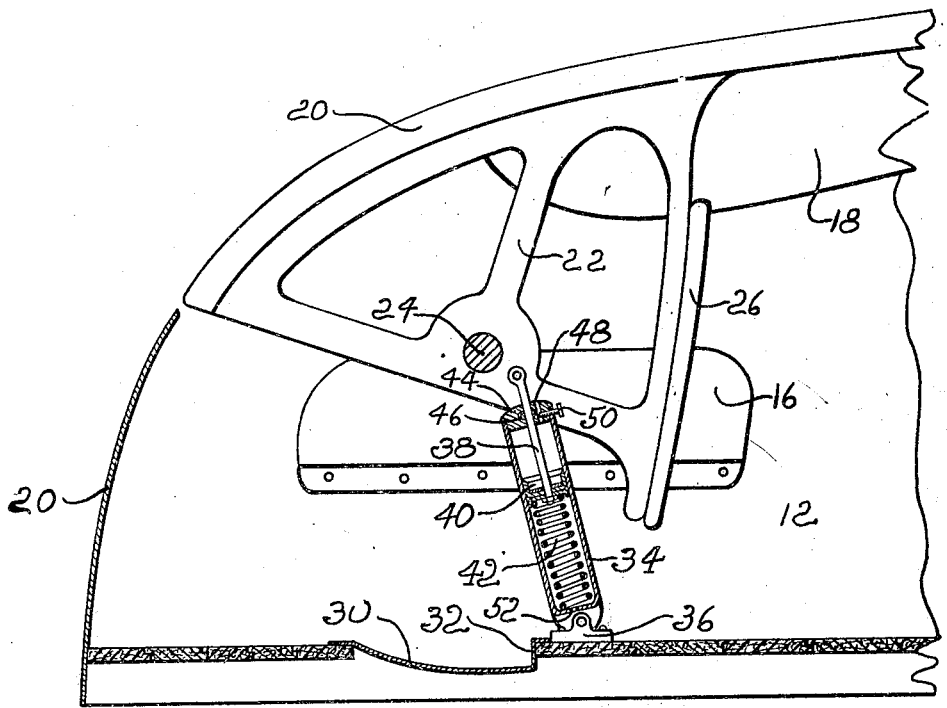
Fig. 2 is an enlarged fragmentary view of the rumble seat and the operating mechanism for the cover or seat back.

Referring to the drawings, an automobile body 10 has been shown provided with a compartment 12 at the rear of a seat 14. A seat 16 is provided in the compartment 12 and a seat back 18 is secured to a portion of the body which forms a cover 20 for the compartment. The cover 20 is secured to brackets 22 which are pivoted to the sides of the body as at 24 and the portion 26 of the bracket 22 is formed to provide an arm rest.

Suitable locking mechanism 28 is secured to the body which holds the cover in closed position. The floor of the compartment 12 has been shown depressed as at 30 to receive the lower end of the cover 20 when it is swung to its position for use as a seat back. The portion 32 forms a stop for the lower edge of the cover or seat back.

In order that the seat back may be swung to its operative position after it has been released or unlocked, I have provided a resilient connection between the floor of the compartment 12 and the bracket 22. The connection consists of a cylinder 34 pivoted to a bracket 36 which is secured to the floor. A rod 38 has one end pivoted to the bracket 22 and its opposite end is provided with a piston 40 adapted to reciprocate in the cylinder 34. A compression spring 42 is provided in the cylinder 34 between the inner end of the cylinder and the inner end of the piston.

The outer end of the piston may be closed as by a cover 44 with suitable packing 46 around the rod 38 to provide an air compression chamber between the piston and the cover 44. An air discharge opening 48 is shown in the cover 44 and a screw 50 is adapted to regulate the size of the opening to thereby determine the amount of air permitted to pass therethru. An opening 52 forms a vent for the portion of the chamber below the piston. If desired the cover 44 may be omitted and the metering screw 50 may be positioned to regulate the opening 52.

It will be understood that when the cover or seat back is in closed position the spring 42 is under compression and held in that position during the time that the seat back is locked. When the seat back is released the compression spring urges it upwardly compressing the air in the cylinder above the piston to retard the movement of the seat back.

By selecting a spring of the proper tension the retarding action may be, for economy, dispensed with and, by proper balancing of the seat back, it may be swung to its open position without jar during the latter part of its movement.

It will be understood that various changes including the construction and arrangement of parts may be made without departing from the spirit of my invention and it is not my intention to limit its scope other than by the terms of the appended claims.

What I claim is:

1. The combination with a vehicle body having a fixed main section provided with a seat, a compartment at the rear of said seat having an opening behind said seat, a seat in said compartment, a cover for said opening pivoted to said main section, a seat back secured to the under side of said cover, means for locking said cover in closed position, and means for automatically raising said cover to a position for use as a seat back when said lock is released.

2. The combination with a vehicle body having a fixed main section provided with a seat, a compartment at the rear of said seat having an opening behind said seat, a seat in said compartment, a cover for said opening pivoted to said main section, a seat back secured to the underside of said cover, means for locking said cover in closed position, and a compression spring adapted to be held under compression when said cover is locked to raise the same to a position for use as a seat back when said lock is released.

3. The combination with a vehicle body having fixed side walls, a seat between said side walls, a seat back provided with lateral brackets pivoted to said side walls, means for locking said seat back in a position over said seat, and resilient compression means adapted to raise said seat back to a position for use when said back is released.

4. The combination with a vehicle body having fixed side walls, a seat between said side walls, a seat back provided with lateral brackets pivoted to said side walls, means for locking said seat back in a position over said seat, resilient compression means adapted to raise said seat back to a position for use when said lock is released, and means for retarding the action of said spring.

5. In a rumble seat construction of the class described comprising, a seat, a pivoted seat back adapted to be swung to a position over said seat and to a position for use at the rear of said seat, means for locking said seat back in a position over said seat, and means whereby potential energy is created when said seat back is in locked position over said seat to raise said seat back to its position for use at the rear of said seat.

FREDERICK A. SELJE.